United States Patent [19]
DeAguiar et al.

[11] Patent Number: 5,990,864
[45] Date of Patent: Nov. 23, 1999

[54] CONVERTING COLOR IMAGES TO AN ARBITRARY PALETTE

[75] Inventors: John Ricardo DeAguiar, Sebastopol; Roy V. Harris, San Rafael, both of Calif.

[73] Assignee: Autodesk, Inc., San Rafael, Calif.

[21] Appl. No.: 09/005,472

[22] Filed: Jan. 12, 1998

[51] Int. Cl.$^6$ .............................. G06F 15/00; G66T 1/00
[52] U.S. Cl. ............................................................ 345/150
[58] Field of Search ............................................. 345/150

[56] References Cited

U.S. PATENT DOCUMENTS

| | | |
|---|---|---|
| 5,047,842 | 9/1991 | Bouman, Jr. et al. . |
| 5,384,902 | 1/1995 | Carlsen et al. . |
| 5,412,766 | 5/1995 | Pietras et al. . |
| 5,432,893 | 7/1995 | Blasubramanian et al. . |
| 5,471,207 | 11/1995 | Zandi et al. . |
| 5,619,230 | 4/1997 | Edgar . |
| 5,706,025 | 1/1998 | Kerman . |

OTHER PUBLICATIONS

Robert W. Floyd and Louis Steinberg, "An Adaptive Algorithm for Spatial Greyscale," *Proceedings of the S.I.D.* vol. 17/2, Second Quarter, 1976, pp. 75–77.

Michael T. Orchard and Charles A. Bouman, "Color Quantization of Images," *IEEE Transactions On Signal Processing*, vol. 39, No. 12, Dec. 1991, pp. 2677–2690.

*Primary Examiner*—Abdollah Katbab
*Attorney, Agent, or Firm*—Gates & Cooper

[57] ABSTRACT

A method, apparatus, and article of manufacture for converting images to an arbitrary palette in a computer. A map table is created from the palette, wherein index entries referencing color values in the palette are stored at nodes in the table having coordinates derived from the referenced color values. For each pixel of an input datastream, the coordinates of the node in the map table representing a color value closest to the color value of the pixel are calculated from the color value for the pixel. An output datastream is created using the color value in the palette referenced by the index entry stored in the node.

36 Claims, 3 Drawing Sheets

5,990,864

CONVERTING COLOR IMAGES TO AN ARBITRARY PALETTE

BACKGROUND OF THE INVENTION

1. Field of the Invention.

The present invention generally relates to computer software, and in particular, to a method, apparatus, and article of manufacture for converting color images to an arbitrary palette.

2. Description of Related Art.

Many computer programs use as many colors as are available from the computer's video subsystem to allow the programs to have as much visual impact as possible. This is fine when the computer program has full control over the palette used by the video subsystem, but special techniques need to be developed to allow the images to be displayed as faithfully as possible when the computer program does not have control over the palette.

SUMMARY OF THE INVENTION

To overcome the limitations in the prior art described above, and to overcome other limitations that will become apparent upon reading and understanding the present specification, the present invention discloses a method, apparatus and article of manufacture for converting images to an arbitrary palette in a computer. A map table is created from the palette, wherein index entries referencing color values in the palette are stored at nodes in the table having coordinates derived from the referenced color values. For each pixel of an input datastream, the coordinates of the node in the map table representing a color value closest to the color value of the pixel are calculated from a color value for the pixel. An output datastream is created using the color value in the palette referenced by the index entry stored in the node.

BRIEF DESCRIPTION OF THE DRAWINGS

Referring now to the drawings in which like reference numbers represent corresponding parts throughout.

DETAILED DESCRIPTION OF THE PREFERRED EMBODIMENT

In the following description of the preferred embodiment, reference is made to the accompanying drawings which form a part hereof, and in which is shown by way of illustration a specific embodiment in which the invention may be practiced. It is to be understood that other embodiments may be utilized and structural changes may be made without departing from the scope of the present invention.

Overview

The objective of the present invention is to process an arbitrary image comprised of pixels and reproduce it on a display or some other device having a palette that is unalterable. The present invention creates a table from a palette, wherein index entries referencing color values in the palette are stored at nodes in the table having coordinates derived from the referenced color values. For each pixel of an input datastream, the coordinates of the node in the map table representing a color value closest to the color value of the pixel are calculated from the color value for the pixel. An output datastream is created using the color value in the palette referenced by the index entry stored in the node.

Hardware Environment

Figure 1:
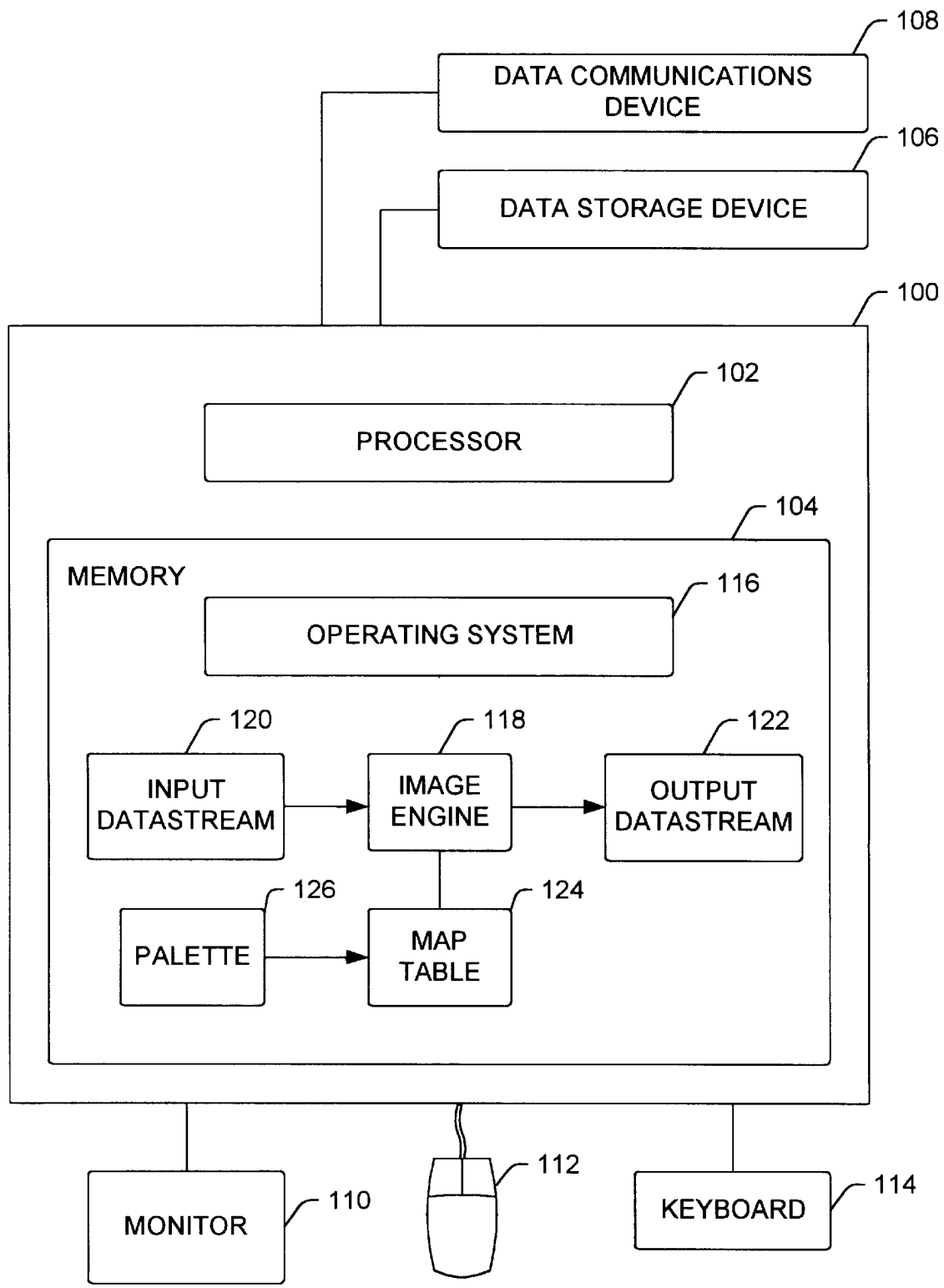
FIG. 1 is an exemplary hardware environment used to implement the preferred embodiment of the invention.

FIG. 1 is an exemplary hardware environment used to implement the preferred embodiment of the invention. The present invention is typically implemented using a computer 100, which generally includes, inter alia, a processor 102, random access memory (RAM) 104, data storage devices 106 (e.g., hard, floppy, and/or CD-ROM disk drives, etc.), data communications devices 108 (e.g., modems, network interfaces, etc.), monitor 110 (e.g., CRT, LCD display, etc.), mouse pointing device 112, and keyboard 114. It is envisioned that attached to the computer 100 may be other devices such as read only memory (ROM), a video card, bus interface, printers, etc. Those skilled in the art will recognize that any combination of the above components, or any number of different components, peripherals, and other devices, may be used with the computer 100.

The computer 100 operates under the control of an operating system (OS) 116, such as WINDOWS™ (NT, 95, or 3.1), OS/2™, UNIX™, etc. The operating system 116 is booted into the memory 102 of the computer 100 for execution when the computer 100 is powered-on or reset. In turn, the operating system 116 then controls the execution of one or more computer programs 118 by the computer 100. The present invention is generally implemented in the computer program 118, although the present invention may be implemented in the operating system 116 itself.

The computer program 118 comprises an image engine 118 that accepts an input datastream 120 and creates an output datastream 122 therefrom. A map table 124 is created from the palette 126, wherein index entries referencing color values in the palette 126 are stored at nodes in the table 124 having coordinates derived from the referenced color values. For each pixel of the input datastream 120, the image engine 118 calculates the coordinates of the node in the map table 124 representing a color value closest to the color value of the pixel using the color value for the pixel. The image engine 118 creates an output datastream using the color value in the palette 126 referenced by the index entry stored in the node.

The operating system 116, image engine 118, input datastream 120, output datastream 122, map table 124, and palette 126 are comprised of instructions and/or data which, when read, interpreted and/or executed by the computer 100, causes the computer 100 to perform the steps necessary to implement and/or use the present invention. Generally, the operating system 116, image engine 118, input datastream 120, output datastream 122, map table 124, and palette 126 are tangibly embodied in and/or readable from a device, carrier, or media, such as memory 102, data storage devices 106, and/or data communications devices 108. Under control of the operating system 116, the image engine 118, input datastream 120, output datastream 122, map table 124, and palette 126 may be loaded from the memory 102, data storage devices 106, and/or data communications devices 108 into the memory 102 of the computer 100 for use during actual operations.

Thus, the present invention may be implemented as a method, apparatus, or article of manufacture using standard programming and/or engineering techniques to produce software, firmware, hardware, or any combination thereof. The term "article of manufacture" (or alternatively, "computer program carrier or product") as used herein is intended to encompass a computer program accessible from any computer program device, carrier, or media. Of course, those skilled in the art will recognize many modifications may be made to this configuration without departing from the scope of the present invention.

Those skilled in the art will recognize that the exemplary environment illustrated in FIG. 1 is not intended to limit the present invention. Indeed, those skilled in the art will recognize that other alternative hardware environments may be used without departing from the scope of the present invention.

Video Subsystem Palettes

Figure 2:
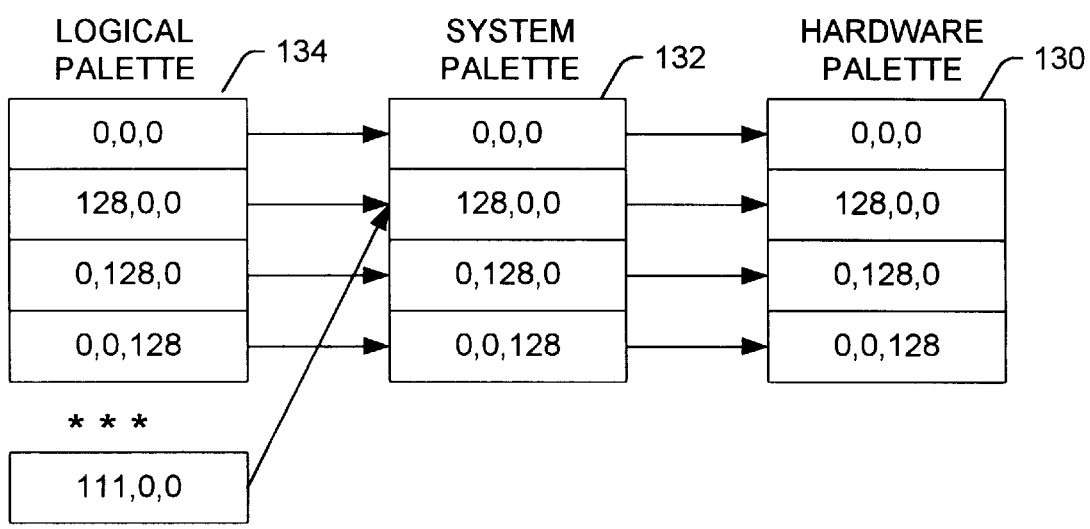
FIG. 2 is a block diagram illustrating the use of a palette for a video subsystem under the WINDOWS™ operating system.

FIG. 2 is a block diagram illustrating the use of a palette for a video subsystem under the WINDOWS™ operating system 116. Under WINDOW™, as well as other operating systems 116, there are three types of palettes used to control the display of colors on the monitor 110: hardware palettes 130, system palettes 132 and logical palettes 134. Each palette comprises one or more entries, wherein each entry is identified by an index value and contains three color fields corresponding to the Red, Green, and Blue (RGB) color values used to create a desired color represented by that entry. The hardware palette 130 stores the entries representing the colors actually displayed on the monitor 110. The system palette 132 is used by computer programs 118 to access and manipulate the hardware palette 130. Each computer program 118, in turn, maintains one or more logical palettes 134 that reflect the desired color selections for the computer program 118. There is normally only one hardware palette 130, and there is a 1:1 mapping between the system palette 132 and the hardware palette 130. Each computer 100 can have only one system palette 130, but every computer program 118 can have as many logical palettes 134 as it needs and there may be numerous computer programs 118 executing on the computer 100.

The logical palettes 134 maintain index entries that reference entries in the system palette 132; the system palette 132 maintains index entries that reference entries in the hardware palette 130. The index entry points to the nearest matching color in the palette which it references. In FIG. 2, the horizontal lines connecting the logical palette 134 to the system palette 132 and the system palette 132 to the hardware palette 130 represent an exact mapping where the RGB colors are identical; the diagonal line connecting the logical palette 134 to the system palette 132 represents a mapping where the RGB colors provide the closest possible matching color value. Sometimes it is necessary to resort to closest possible matching color value because the number of colors in the logical palette 134 exceed the number of possible entries in the system palette 132.

A computer program 118 that is the active entity executing on the computer 100 is permitted to provide an exact mapping from its logical palette 134 to the system palette 132; all idle computer programs 118 must settle for the remaining closest possible matching color value. In FIG. 2, for example, the logical palette 134 is the "Active Window," and thus it adds its colors to the system palette 132 first, so that its colors look the best (i.e., most exact) of any palette-based computer program 118 in the computer 100.

Color Conversion Method

The objective of the present invention is to process an arbitrary image comprised of color pixels and reproduce it on a display or some other device having a color palette 126 that is dictated by some external entity or program. In other words, the target palette 126 is considered to be unalterable (although it may be alterable by other components of the computer 100). The problem is how to best render an image to the fixed target palette 126.

In the present invention, the image engine 118 first examines the target palette 126 to construct the map table 124, wherein the map table 124 comprises a one or three dimensional array. For color palettes, the array is three-dimensional, wherein each dimension represents values for one of the colors: red, green, blue. The intervals between the color values in each of the dimensions or axes of the table are allocated in a specific manner. In the preferred embodiment, the intervals are a power of 2, e.g., 2, 4, 8, 16, 32, 64, etc., between the minimum and maximum values of 0 and 255, respectively. Of course, in other embodiments, other intervals may be used.

The size of each of the dimensions or axes of the table are allocated in a specific manner. In the preferred embodiment, the dimension is $M=2^N+1$ so that entries 0 and M−1 correspond to the minimum and maximum intensity values of 0 and 255, respectively. Of course, in other embodiments, other values may be used. Since colors in the palette 126 are represented by three values (red, green, blue) between 0 and 255, the total number of entries in the map table 124 in this embodiment is the product of the number of entries for each of the dimensions.

In one exemplary embodiment, N is 3 and $M=2^3+1=9$, so the three dimensional map table 124 comprises an array of (9,9,9) or 729 nodes or entries. The interval between nodes or entries comprises INTERVAL=255/(M−1). Node(0) has an index entry that references the palette 126 entry having a color value of 0 and Node(M−1) has an index entry that references the palette 126 entry having a color value of 255. The remaining nodes in the map table 124 store an index entry that references the palette 126 entry having a color value that is the closest possible matching color value to the color value represented by the coordinates for that node in the table 124. Given a color value, the closest node is determined by node=ROUND(color/INTERVAL).

For example, assume that a node has red a value of 0, a green value of 128, and a blue value of 32. The image engine 118 can determine the coordinates of the node representing these color values by dividing each value by the corresponding dimension interval. For example, if the array is of size (9,9,9), then the node representing the above value is (0, 4, 1), as indicated from the calculations 0/32, 128/32, and 32/32. The value stored at this location of the array is an index entry pointing to the nearest matching color in the palette 126.

To create the map table 124, the palette 126 is searched for the color values that are closest to each of the node coordinates in the map table 124. In this context, closeness is defined by Euclidean distance, i.e., the sum of the squared differences between each component of those colors.

Every node in the three dimensional map table 124 contains an index entry pointing to a color value from the palette 126, although every color value present in the palette 126 may not have been stored into the map table 124. On the other hand, many, and possibly all, of the palette 126 color values may appear in more than one node in the map table 124, especially if the map table 124 is larger than 256 nodes or elements, since there are at most 256 entries in the palette 126. As a result, there is often some redundancy in the map table 124.

After the map table 124 has been created, the image engine 118 uses the color value of a pixel in the input data stream 120 to calculate the coordinates of the node in the map table 126 representing a color value closest to the color value of the pixel. The image engine 118 then generates the output datastream 122 using the color value in the palette 126 referenced by the index entry stored in the node of the map table 124, even though this color value may not be the closest possible matching color value in the palette 126. As a result, the present invention may involve a tradeoff between performance and optimal color values.

The image engine 118 calculates the coordinates of the node in the map table 124 by performing shift operations on the color value components of the pixel in the input datastream 120. This works especially well when the number of entries for a dimension of the map table 124 is a power of 2.

For example, assume that the green dimension of the map table 124 has four entries, representing green color values of 0, 64, 128, and 192. The image engine 118 can determine the coordinates for node in the map table 124 that is the closest possible matching color value to the green value of the pixel of the input datastream 120 by dividing the green value of the pixel by 64, which results in a number between 0 and 3 (after truncating the remainder).

After this is performed for all three color value components of the pixel in the input datastream 120, the coordinates for a particular node in the map table 124 are determined from the resulting calculated values. The node itself stores an index entry referencing a color value in the palette 126 that is inserted for the pixel into the output datastream 122.

Usually, there is some difference between the color value in the table 124 and the color value of the pixel in the input datastream 120. This difference, known as the color error, exists separately in the red, green, blue values for the pixel. A technique known as error diffusion takes the color error in the pixel and adds it to the color value of the next pixel in the input datastream 120.

The process of calculating the node in the table 124 and then inserting a pixel of the color value using the color value in the palette 126 referenced by the index entry stored in the node into the output datastream 122 is repeated using the next pixel, after error diffusion has been performed. Again, there is usually some color error between the color values of the nodes in the map table 124 and the true color value of the next pixel in the input datastream 120, and error diffusion is again applied to the color value of the next pixel in the input datastream 120. These steps are repeated for the entire input datastream 120.

Gray-Scale Conversion Method

Gray-scale or monochrome provides merely a simpler case for the present invention. Instead of the map table 124 comprising three dimensions for three colors, there is only one dimension indicating black or white. Since there is a single dimension, the total number of entries in the map table 124 in this embodiment is the number of entries for the single dimension.

In one embodiment, the image engine 118 may create a map table 124 having 256 nodes—one node for each possible gray-scale value. The image engine then stores an index entry in each node that references the closest possible matching color value in the target palette 126.

If the target palette 126 is a color palette, the present invention first searches through the palette 126 to find the color values that are the closest to being different shades of gray, e.g., black, white, and other gray values or colors that are close to gray. The one-dimensional table 124 is then populated with index entries pointing to those color values in the palette 126.

The present invention also works for color images that are being converted to a monochrome images. The image engine 118 first translates the color value of the pixel in the input datastream 120 into its corresponding luminance value. This luminance values are then processed through the map table 124 to create the gray-scale values for the output datastream 122.

Parameter Description

A number of parameters can be used to control the processing performed by the image engine 118 according to the present invention. These parameters are described in more detail below.

A Quality parameter is used to indicate the quality of the palette 126 conversion method. The present invention provides selectable quality levels, including draft quality (which could skip certain processing steps and end up with a rougher image, but with less computation required) and good quality. Currently, the preferred embodiment provides only good quality images.

A Transparency parameter indicates how the mapping of transparencies should be performed. If the parameter is set to TRUE and the input color space type is RGB, RGBA, or gray, then transparent (alpha=0) or key value input pixels are mapped to the key color value specified in the map table 124. This parameter instructs the function to either ignore transparency on the input or acknowledge and honor transparency in the input by turning it into a key color output. In other words, it preserves transparency of a pixel, e.g., an RGBA image that has an alpha value of 0, meaning it is fully transparent. If the parameter is true, then the function produces a pixel on the output that has the index that is specified as the transparent color index of the map table 124.

A GrayInputKeyValue parameter is the input transparent key value, used only for gray input color space types. This parameter allows for the processing of gray-scale images that have a transparent key value. In the present invention, gray-scale images do not need a palette 126. If one of those gray values represents a transparent value that information is passed through to the output datastream 122.

Flowchart

Figure 3:
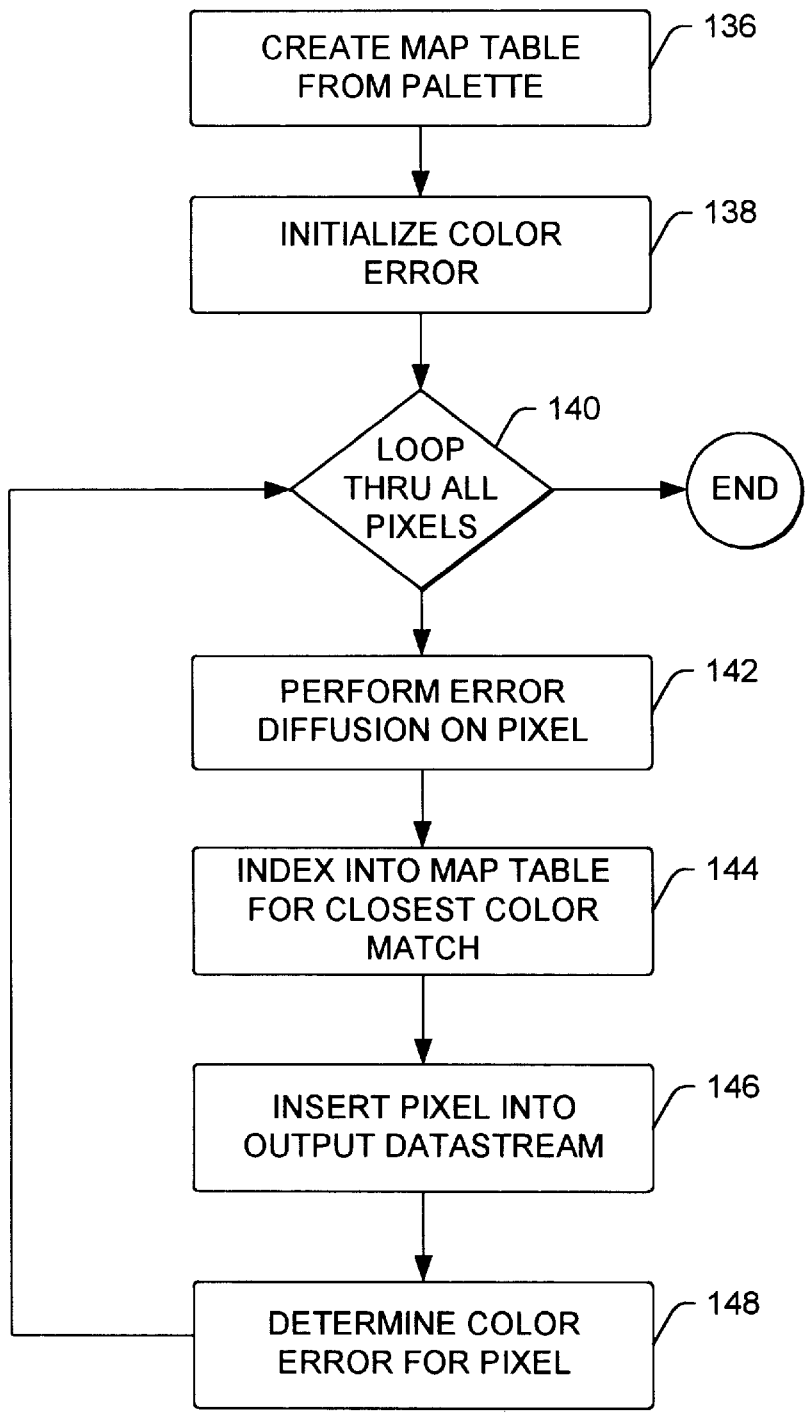
FIG. 3 is a flowchart that illustrates the steps performed by the image engine according to the present invention.

FIG. 3 is a flowchart that illustrates the steps performed by the image engine 118 according to the present invention.

Block 136 represents the image engine 118 using a target palette 126 to create a map table 124 that indicates how to access particular color values in that palette 126.

Block 138 represents the image engine 118 creating an initial color error for the input datastream 120.

Blocks 140–148 are a loop that represent the image engine 118 processing all of the pixels in the input datastream 120.

Block 142 represents the image engine 118 performing error diffusion on the next pixel in the input datastream 120, using the color error from the prior pixel (or the initial color error).

Block 144 represents the image engine 118 using the pixel to index into the map table 124, i.e., to calculate the coordinates of the node in the map table 124 having the closest possible matching color value for the pixel.

Block 146 represents the image engine 118 inserting a pixel into the output datastream 122 using the color value in the palette 126 referenced by the index entry stored in the node of the map table 124.

Block 148 represents the image engine 118 determining the color error between the closest possible matching color value in the table and palette 126, and the true color value of the pixel in the input datastream 120.

Thereafter, control is transferred back to Block 140.

The objective of the present invention is to process an arbitrary image comprised of pixels and reproduce it on a display or some other device having a palette that is unalterable. The present invention creates a table from a palette Conclusion This concludes the description of the preferred embodiment of the invention. In summary, the present invention comprises a method, apparatus, and article of manufacture for converting images to an arbitrary palette in a computer. A map table is created from the palette, wherein index entries referencing color values in the palette are stored at nodes in the table having coordinates derived from the referenced color values. For each pixel of an input datastream, the coordinates of the node in the map table representing a color value closest to the color value of the pixel are calculated from the color value for the pixel. An output datastream is created using the color value in the palette referenced by the index entry stored in the node.

The following paragraphs describe some alternative ways of accomplishing the present invention.

Those skilled in the art will recognize that different computer programs, operating environments, and operating systems could be substituted for those described herein.

Those skilled in the art will recognize that the present invention could be used any type of computer, and need not be limited to a personal computer.

Those skilled in the art will recognize that the present invention could be used any type of display interface, palette, or video subsystem, and need not be limited to the example described herein.

Those skilled in the art will recognize that alternate approaches to mapping palettes to tables, arrays, or other structures could be substituted for the approach described herein without departing from the scope of the present invention.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A computer-implemented method for converting images to an arbitrary palette in a computer, comprising the steps of:
   (a) creating a map table from a palette, wherein index entries referencing color values in the palette are stored at nodes of the map table having coordinates derived from the referenced color values;
   (b) calculating the coordinates of the node of the map table from a color value for an input pixel; and
   (c) generating an output pixel using a color value in the palette referenced by the index entry stored in the node of the map table identified by the calculated coordinates.

2. The method of claim 1 above, wherein the palette is unalterable.

3. The method of claim 1 above, wherein the creating step (a) further comprises the steps of:
   (1) creating the map table as an array, wherein each dimension of the array represents values for red, green and blue colors, respectively, and an interval between entries in each dimension of the array is pre-defined; and
   (2) searching the palette for color values therein; and
   (3) storing index entries in the map table referencing the color values in the palette at a node in the table having coordinates derived from the color values.

4. The method of claim 3 above, wherein the storing step further comprises the step of deterring the coordinates by dividing the color values in the palette by the interval between nodes in the dimension of the array.

5. The method of claim 4 above, wherein the determining step further comprises the step of determining the coordinates in the table for a red color dimension by dividing red color values in the palette by the interval between entries in the red color dimension of the array.

6. The method of claim 4 above, wherein the determining step further comprises the step of determining the coordinates in the table for a green color dimension by dividing green color values in the palette by the interval between entries in the green color dimension of the array.

7. The method of clam 4 above, wherein the determining step further comprises the step of determining the coordinates in the table for a blue color dimension by dividing blue color values in the palette by the interval between entries in the blue color dimension of the array.

8. The method of claim 1 above, further comprising the step of performing error diffusion on the input pixels.

9. The method of claim 8 above, wherein the performing step further comprises the steps of:
   determining a difference between a closest possible matching color value in the map table and a color value of the pixel; and
   adding the difference to a next pixel.

10. The method of claim 1 above, wherein the creating step further comprises the steps of:
    (1) creating the map table as an array, wherein a dimension of the array represents color values represent gray-scale values, and an interval between nodes in a dimension of the array is pre-defined; and
    (2) searching the palette for color values therein; and
    (3) storing index entries in the table referencing the color values in the palette at the nodes in the map table having coordinates derived from the color values.

11. The method of claim 10 above, wherein the storing step further comprises the step of determining the coordinates in the map table by dividing the color values in the palette by the interval between nodes in the dimension of the array.

12. The method of claim 11 above, wherein the determining step further comprises the step of determining the coordinates in the map table for a gray-scale dimension by dividing color values in the palette by the interval between entries in the gray-scale dimension of the array.

13. A computer-implemented apparatus for converting images to an arbitrary palette in a computer, comprising:
    (a) a computer; and
    (b) one or more computer programs, performed by the computer, for creating a map table from a palette, wherein index entries referencing color values in the palette are stored at nodes of the map table having coordinates derived from the referenced color values, for calculating the coordinates of the node of the map table from a color value for an input pixel, and for generating an output pixel using a color value in the palette referenced by the index entry stored in the node of the map table identified by the calculated coordinates.

14. The apparatus of claim 13 above, wherein the palette is unalterable.

15. The apparatus of claim 13 above, wherein the computer program for creating further comprises:
  (1) means for creating the map table as an array, wherein each dimension of the array represents values for red, green and blue colors, respectively, and an interval between entries in each dimension of the array is pre-defined; and
  (2) means for searching the palette for color values therein; and
  (3) means for storing index entries in the map table referencing the color values in the palette at a node in the table having coordinates derived from te color values.

16. The apparatus of claim 15 above, wherein the means for storing further comprises means for determining the coordinates by dividing the color values in the palette by the interval between nodes in the dimension of the array.

17. The apparatus of claim 16 above, wherein the means for determining further comprises means for determining the coordinates in the table for a red color dimension by dividing red color values in the palette by the interval between entries in the red color dimension of the array.

18. The apparatus of claim 16 above, wherein the means for determining further comprises means for determining the coordinates in the table for a green color dimension by dividing green color values in the palette by the interval between entries in the green color dimension of the array.

19. The apparatus of claim 16 above, wherein the means for determining further comprises means for determining the coordinates in the table for a blue color dimension by dividing blue color values in the palette by the interval between entries in the blue color dimension of the array.

20. The apparatus of claim 13 above, further comprising means for performing error diffusion on the input pixels.

21. The apparatus of claim 20 above, wherein the means for performing further comprises:
  means for determining a difference between a closest possible matching color value in the map table and a color value of the pixel; and
  means for adding the difference to a next pixel.

22. The apparatus of claim 13 above, wherein the computer program for creating further comprises:
  (1) means for creating the map table as an array, wherein a dimension of the array represents color values represent gray-scale values, and an interval between nodes in a dimension of the array is pre-defined; and
  (2) means for searching the palette for color values therein; and
  (3) means for stoning index entries in the table referencing the color values in the palette at the nodes in the map table having coordinates derived from the color values.

23. The apparatus of claim 22 above, wherein the means for storing further comprises means for determining the coordinates in the map table by dividing the color values in the palette b the interval between nodes in the dimension of the array.

24. The apparatus of claim 23 above, wherein the means for determining further comprises means for determining the coordinates in the map table for a gray-scale dimension by dividing color values in the palette by the interval between entries in the gray-scale dimension of the array.

25. An article of manufacture comprising a computer program carrier tangibly embodying one or more instructions that when executed by a computer causes the computer to perform a method for converting images to an arbitrary palette in a computer, the method comprising the steps of:
  (a) creating a map table from a palette, wherein index entries referencing color values in the palette are stored at nodes of the map table having coordinates derived from the referenced color values;
  (b) calculating the coordinates of the node of the map table from a color value for an input pixel; and
  (c) generating an output pixel using a color value in the palette referenced by the index entry stored in the node of the map table identified by the calculated coordinates.

26. The method of claim 25 above, wherein the palette is unalterable.

27. The method of claim 25 above, wherein the creating step (a) further comprises the steps of:
  (1) creating the map table as an array, wherein each dimension of the array represents values for red, green and blue colors, respectively, and an interval between entries in each dimension of the array is pre-defined; and
  (2) searching the palette for color values therein; and
  (3) storing index entries in the map table referencing the color values in The palette at a node in the table having coordinates derived from the color values.

28. The method of claim 27 above, wherein the storing step further comprises the step of determining the coordinates by dividing the color values in the palette by the interval between nodes in the dimension of the array.

29. The method of claim 28 above, wherein the determining step further comprises the step of determining the coordinates in the table for a red color dimension by dividing red color values in the palette by the interval between entries in the red color dimension of the array.

30. The method of claim 28 above, wherein the determining step further comprises the step of determining the coordinates in the table for a green color dimension by dividing green color values in the palette by the interval between entries in the green color dimension of the array.

31. The method of claim 28 above, wherein the determining step further comprises the step of determining the coordinates in the table for a blue color dimension by dividing blue color values in the palette by the interval between entries in the blue color dimension of the array.

32. The method of claim 25 above, further comprising the step of performing error diffusion on the input pixels.

33. The method of claim 32 above, wherein the performing step further comprises the steps of:
  determining a difference between a closest possible matching color value in the map table and a color value of the pixel; and
  adding the difference to a next pixel.

34. The method of claims 25 above, wherein the creating step further comprises the steps of:
  (1) creating the map table as an array, wherein a dimension of the array represents color values represent gray-scale values, and an interval between nodes in a dimension of the array is pre-defined; and (2) searching the palette for color values therein; and (3) storing index entries in the table referencing the color values in the palette at the nodes in the map table having coordinates derived from the color values.

35. The method of claim 34 above, wherein the storing step further comprises the step of determining the coordinates in the map table by dividing the color values in the palette by the interval between nodes in the dimension of the array.

36. The method of claim 35 above, wherein the determining step further comprises the step of determining the coordinates in the map table for a gray-scale dimension by dividing color values in the palette by the interval between entries in the gray-scale dimension of the array.

* * * * *

UNITED STATES PATENT AND TRADEMARK OFFICE
CERTIFICATE OF CORRECTION

PATENT NO. : 5,990,864

DATED : November 23, 1999

INVENTOR(S) : John Ricardo DeAguiar and Roy V. Harris

It is certified that error appears in the above-identified patent and that said Letters Patent is hereby corrected as shown below:

Column 9, line 22, after "from", "te" should read --the--.

Column 9, line 59, after "for", "stoning" should read --storing--.

Column 9, line 66, after "palette", "b" should read --by--.

Column 10, line 33, after "in" (first occurrence) "The" should read --the--.

Signed and Sealed this

Twenty-ninth Day of May, 2001

*Attest:*

NICHOLAS P. GODICI

*Attesting Officer*     *Acting Director of the United States Patent and Trademark Office*